April 29, 1930.  C. G. BORDEAUX  1,756,725
COFFEEPOT
Filed June 12, 1929  2 Sheets-Sheet 1
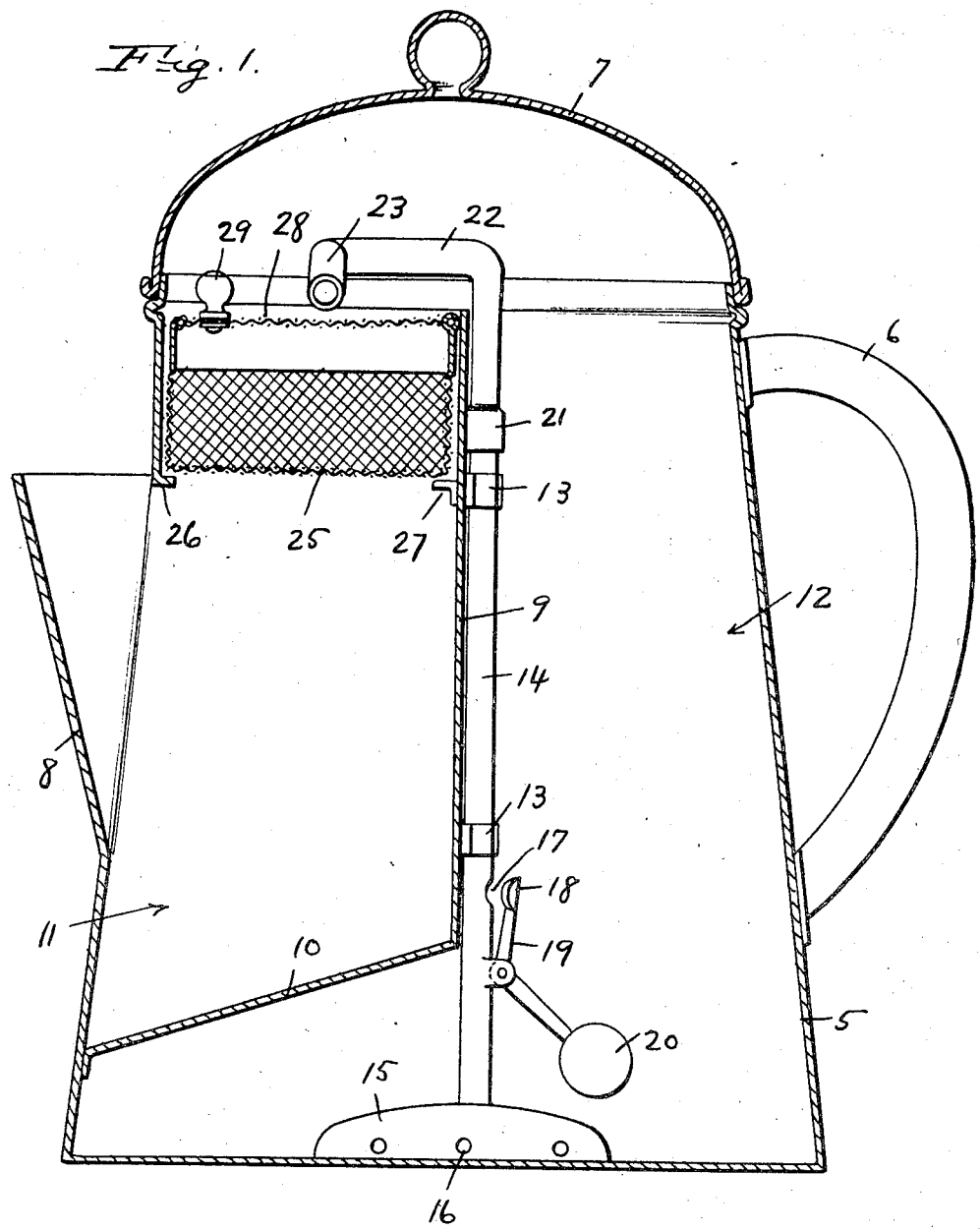
Inventor
Claude G. Bordeaux
By Clarence A. O'Brien
Attorney April 29, 1930.  C. G. BORDEAUX  1,756,725
COFFEEPOT
Filed June 12, 1929    2 Sheets-Sheet 2
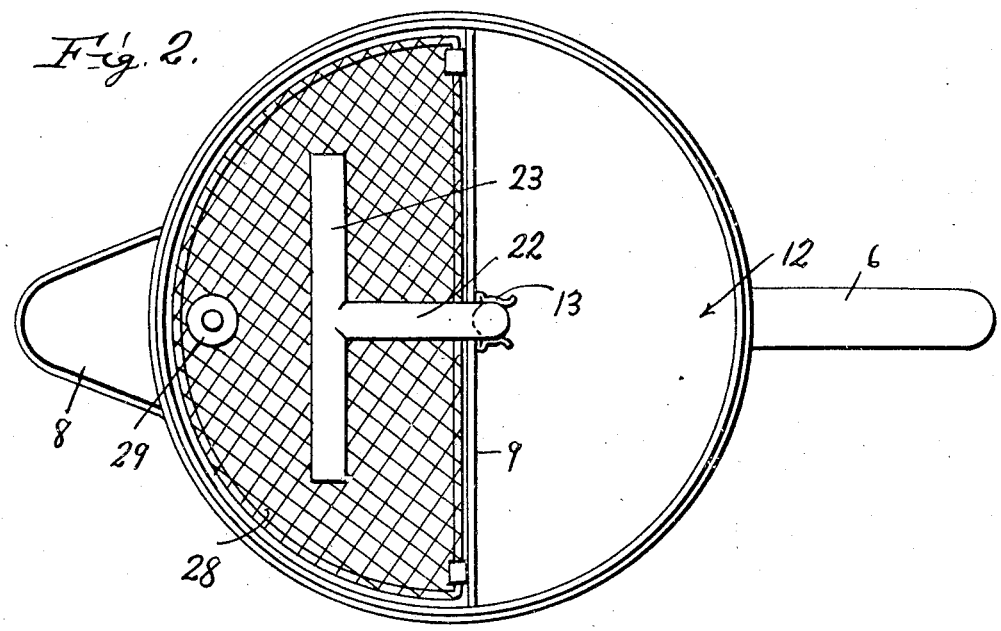
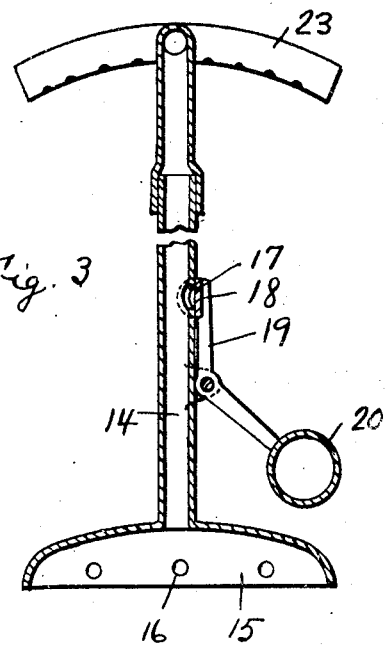
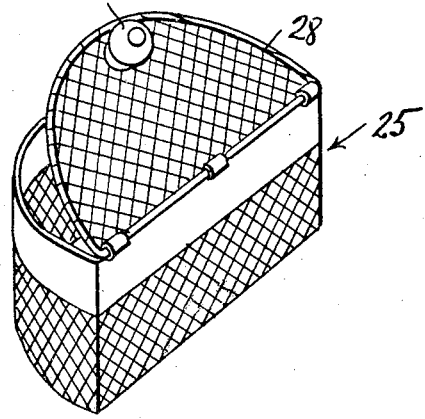
Inventor
Claude G. Bordeaux
By Clarence A. O'Brien
Attorney Patented Apr. 29, 1930

1,756,725

UNITED STATES PATENT OFFICE

CLAUDE GEORGE BORDEAUX, OF SLINGERLANDS, NEW YORK

COFFEEPOT

Application filed June 12, 1929. Serial No. 370,353.

This invention relates to an improved coffee pot embodying an arrangement of features cooperating to make drip coffee in a more satisfactory and desirable manner than can be accomplished with the present day percolators.

It is generally conceded that to make good coffee it must not be boiled. In general, when coffee is made with the present day marketed urns and pots, it is continuously boiled, thus making it unduly strong and frequently distasteful. It has been recently discovered by applicant that excellent coffee may be made by simply dripping boiling water over the ground coffee, not allowing the coffee grounds to mix with the made coffee. With the foregoing thought in mind, I have evolved and produced simplified structure which will cause the hot water to drip slowly upon the ground coffee in a foraminous container and to accumulate in said compartment which is arranged apart from the main chamber and wherein the main chamber is so constructed as to maintain a predetermined quantity of water to prevent the pot from unduly burning, yet retaining sufficient heat within the container to keep the coffee in its separate chamber warm.

The particular details for accomplishing this improved result will become more readily apparent from the following description and drawings.

In the drawings:

Figure 1 is a central vertical sectional view through a coffee pot constructed in accordance with the present invention.

Figure 2 is a top plan view with the lid or cover removed.

Figure 3 is a contracted sectional and elevational view of the water column elevating tubes and distributor.

Figure 4 is a perspective view of the coffee containing basket.

The coffee pot as seen in Figure 1 comprises a body portion 5 of appropriate configuration having a handle 6, and a removable lid 7 and discharge spout 8. This is made on its interior with the vertical partition 9 and the horizontal inclined partition 10, forming the made coffee compartment 11.

The main water compartment is indicated at 12. The partition 9 is provided with clips 13, with which the water elevating tube 14 is connected. This tube is provided at its bottom with a concavo-convex base 15, to rest on the bottom of the pot and the base is in turn provided with water intake ports 16. The reference character 17 designates a vent hole which under predetermined conditions is closed by a valve 18. This valve is mounted on a ball crank 19, which in turn is pivotally mounted on the lower end portion of the tube and is provided with a ball float 20. A substantially L-shaped pipe is provided at the top and this has a coupling 21 telescopically connected with the upper end of the tube 14 and the horizontal branch 22 that carries an overhanging distributing head 23, carrying a multiplicity of water discharge ports. This head is arranged over the wire basket 25 which is adapted to contain the coffee. The basket is seated on the supporting lug or ledges 26 and 27, and is provided with a hinged cover 28 and an operating knob 29. The L-shaped section of the water delivering conduit or pipe is detachable to facilitate application or removal of the wire basket.

By placing one or two cups of water in the pot, the float 20 will be acted on and will close the valve 18 over the port 17. When the water begins to boil, it will be elevated in the tube 14 and the L-shaped pipe and is caused to drip down on the ground coffee in the basket 25. This dripping action is comparatively slow and as the water passes through the coffee in the basket, it obtains sufficient strength to make good coffee, which is maintained in the chamber 11.

As the water is boiled in the chamber 12, it is elevated until the level reaches the point to permit the float 20 to swing down and open the valve 18. The body of water then discharges continuously through the port 17 to relieve resistance in the elevating conduit to prevent burning out of the pot. At the same time, it generates sufficient heat in the chamber 12 to keep the chamber 11 warm and to maintain the coffee therein in a good condition. It is of course necessary that a sufficient number of cups of water be placed in the chamber 12 to make the desired quantity of coffee in the chamber 11. It is to be observed that the basket is readily removable to permit it to be filled with coffee and to permit the grounds to be emptied. Then, too, the parts of the conduit are bodily removable to permit thorough cleaning. Thus, the pot is quite sanitary and will fulfill the requirements of a domestic cooking appliance of this class.

Persons skilled in the art to which the invention relates will be able to obtain a clear understanding of the construction and features and advantages by considering the description in connection with the drawings. Therefore a more lengthy description is believed to be unnecessary.

Minor changes in the shape, size and rearrangement of features, coming within the field of invention claimed may be resorted to, in actual practice if desired.

What is claimed is:

As a new product of manufacture, an accessory for use in association with a coffee maker of the class described comprising a hollow concavo-convex base having water inlet apertures, a tube rising vertically therefrom and provided with a vent port, a bell crank mounted on the tube below said port, a valve carried by one arm of the bell crank and cooperable with said port, and a float carried by the remaining arm, a substantially L-shaped pipe having a vertical branch fitted telescopically and detachably over the end portion of said tube, and a horizontally right angularly disposed apertured distributing head carried by the horizontal branch of said L-shaped pipe.

In testimony whereof I affix my signature.

CLAUDE GEORGE BORDEAUX.